United States Patent [19]

Blauvelt et al.

[11] 4,042,126
[45] Aug. 16, 1977

[54] METHODS AND APPARATUS FOR RETRIEVAL OF STORED ARTICLES FROM A STACK

[75] Inventors: Lon Blauvelt, Niles, Mich.; J. Douglas Dickson; Robert C. Russell, both of Columbus, Ohio

[73] Assignee: Simplicity Pattern Co. Inc., New York, N.Y.

[21] Appl. No.: 661,742

[22] Filed: Feb. 26, 1976

[51] Int. Cl.² .............................................. B65G 59/00
[52] U.S. Cl. .................... 214/8.5 A; 214/1 BV; 214/8.5 D; 214/152; 271/107
[58] Field of Search ............ 214/8.5 R, 8.5 A, 8.5 C, 214/8.5 D, 1 B, 1 BB, 1 BC, 1 BD, 1 BS, 1 BT, 1 BV, 1 BH, 7, 8.5 K, 152; 221/211; 271/20, 107

[56] References Cited

U.S. PATENT DOCUMENTS

| 2,628,453 | 2/1953 | Pye et al. | 214/1 B T X |
| 2,790,536 | 4/1957 | Reed | 214/1 BT X |
| 3,176,978 | 4/1965 | Baker et al. | 271/107 X |
| 3,690,477 | 9/1972 | Nilsson | 214/8.5 D X |
| 3,690,479 | 9/1972 | Castaldi | 214/8.5 D X |
| 3,884,278 | 5/1975 | Nakashima | 214/1 B T X |

FOREIGN PATENT DOCUMENTS

| 521,964 | 2/1954 | Belgium | 271/107 |

Primary Examiner—Frank E. Werner
Attorney, Agent, or Firm—Watson, Leavenworth, Kelton & Taggart

[57] ABSTRACT

Pattern envelopes or like flat articles retained in stack configuration by elements engaging marginal portions of the lead article are withdrawn substantially in such flat condition by displacing the lead article in its entirety in a manner spacing at least one lead article marginal portion from its associated retaining element and then displacing the same outwardly of the stack spacedly from the retaining element. Further outward displacement of the withdrawn marginal portion effects sequential withdrawal of the other marginal portion from the stack.

9 Claims, 15 Drawing Figures

METHODS AND APPARATUS FOR RETRIEVAL OF STORED ARTICLES FROM A STACK

FIELD OF THE INVENTION

This invention relates to article storage and retrieval systems and more particularly to methods and apparatus for removing individual articles from stacks of stored articles of generally flat configuration.

BACKGROUND OF THE INVENTION

In garment pattern warehousing and like operations, it is customary to organize compartments, each containing a stack of envelopes containing patterns of singular character, in access position to pattern retrieval apparatus. Such retrieval apparatus may be supported for selective horizontal and vertical movement to face a preselected single compartment, as shown in Castaldi U.S. Pat. No. 3,690,479, or may comprise a unit movable horizontally and having plural retriever devices arranged vertically so as to face plural vertically stacked compartments, as shown in Dennis U.S. Pat. No. 3,076,566.

As is disclosed in the two above-referenced patents, retriever devices for garment patterns involve an air pressurized suction head selectively translatable into engagement with the lead article in a compartment and adapted to move the engaged article exteriorly of the stack on suction head withdrawal. In the first-referenced patent, the stack of patterns is biased against detent rods which are disposed in the access opening of the compartment and engage frontal marginal portions of the lead pattern to restrain the same from movement exteriorly of the compartment. On withdrawal from the stack, such lead pattern is engaged centrally by the suction head and the pattern central portion is withdrawn, while bowed relative to the pattern marginal portions, until the pattern edges are moved clear of the restraining detent rods. In the second-referenced patent, similar lead pattern bowing or deflection occurs to permit the pattern to free itself of peripheral compartment lips serving likewise to retain patterns in their stacks.

Deflection of retrieved articles such as occurs in each of the referenced pattern retrieving systems is undesirable as giving rise to possible damage to envelope contents. Further, the envelope-contained patterns in different compartments are typically diverse from one another in respect of numbers of sheets and types of sheets, i.e., tissue versus relatively rigid sheets. Thus, where either a common pattern retriever device is used for retrieval from all bins or where plural pattern retrievers of like structure are employed, retriever suction level need be set to accommodate the pattern having greatest resistance to deflection. At the same time, use of said high suction level with, for example, a pattern comprising but a single tissue is not only a wasteful endeavor but is more likely to damage the retrieved pattern.

In article retrieval systems known to applicant other than those particularly involving the retrieval of garment patterns, like article deflection is also seen to occur. In Bliss U.S. Pat. No. 3,322,301 the lead article edges are disposed in engagement with restraint elements aside the article stack. A suction head is moved into engagement with the lead article and applies suction to its marginal portions to deflect them outwardly of the stack with the article center remaining in engagement with the stack. In Seragnoli U.S. Pat. No. 3,816,760 a suction head comprised of laterally displaced suction tubes is moved into engagement with the lead article whereupon the spacing between the tubular elements is reduced with consequent bowing deflection of the article central portion relative to the article edges as in the above-referenced pattern retrieval patents.

SUMMARY OF THE INVENTION

It is an object of the present invention to provide improved suction head article retrieval apparatus.

It is a more particular object of the invention to provide apparatus of the subject type wherein deflection of retrieved articles is minimized.

A further object of the invention is to provide improved methods for the removal of articles from article stacks wherein the lead article is engaged by movement-restraining elements.

In attaining the foregoing and other objects, the invention provides methods wherein the lead article of articles stacked along a stacking axis is displaced in its entirety in a manner spacing at least one lead article marginal portion from the retaining element theretofore engaging such marginal portion. This marginal portion is then withdrawn from the stack and is displaced further outwardly of the stack to effect sequential withdrawal of the other lead article marginal portion outwardly of the stack. Apparatus for practicing the invention includes a suction head and a drive therefor operative to place the suction head in engagement with the lead article, to then displace the suction head so as to move at least one marginal portion of the lead article from engagement with its associated retaining element, and to move such lead article marginal portion outwardly of the stack. The drive preferably displaces the lead article transversely of the stacking axis and inwardly therealong in spacing its marginal portion from the associated retaining element. In its particularly preferred embodiment, the apparatus includes mechanism pivotally supporting the suction head and imparting selective rotation thereto following engagement of the suction head and the lead article to assist withdrawal of the lead article from the stack. In a further apparatus arrangement, the suction head is not supported for such pivotal movement and includes an element for frictionally engaging the lead article to provide for initial frictional force displacement thereof transversely of the stacking axis followed by application of suctional force to the displaced lead article.

The foregoing and other objects and features of the invention will be further evident from the following detailed description of preferred and other embodiments thereof and preferred and other method practices and from the drawings wherein like reference numerals identify like parts throughout.

DESCRIPTION OF THE PREFERRED EMBODIMENTS

Figure 1:
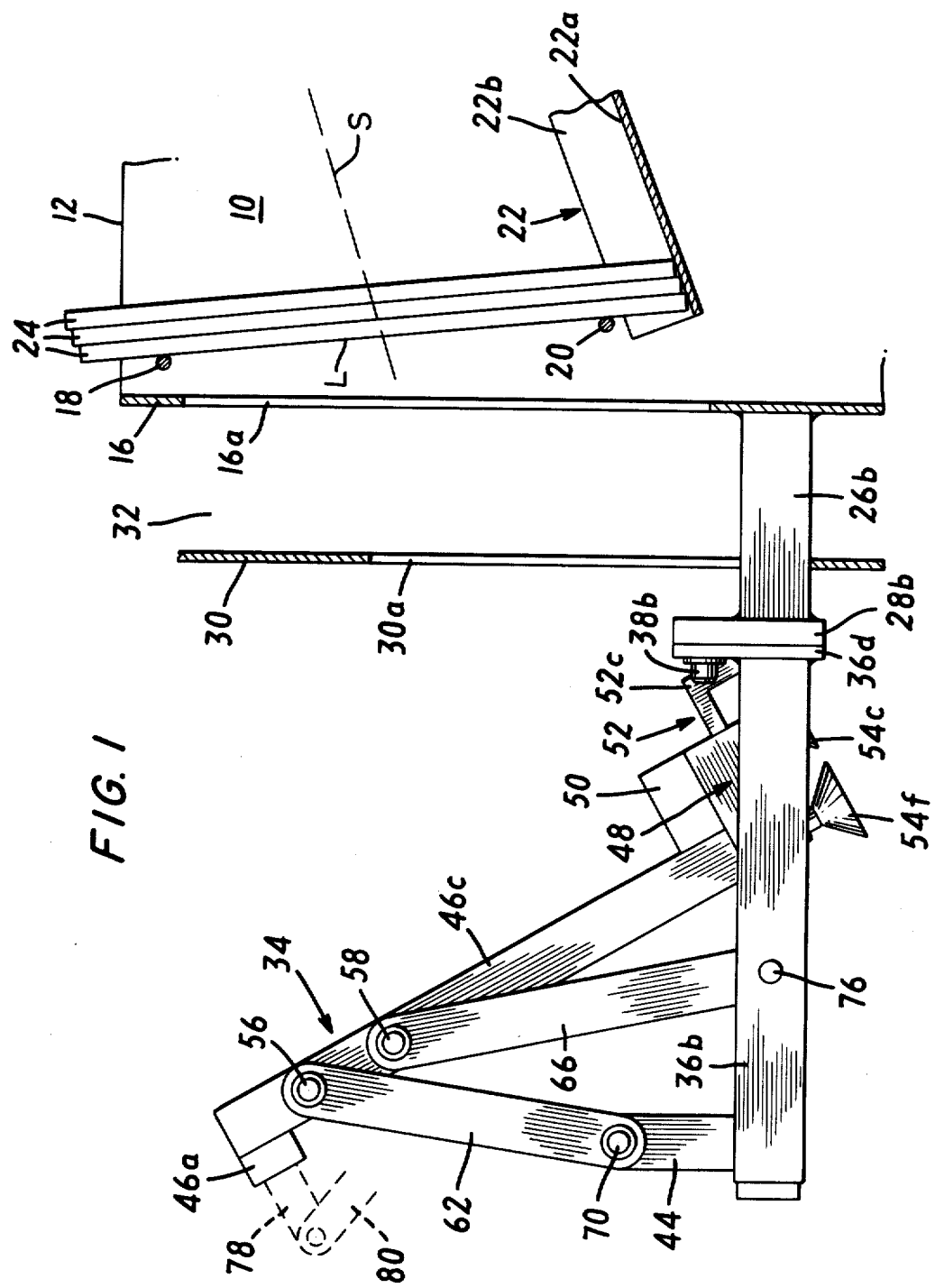
FIGS. 1-3 are frontal views of one embodiment of pattern retrieval apparatus of the invention in respective successive movements thereof toward and engaging an article stack.
Figure 4:
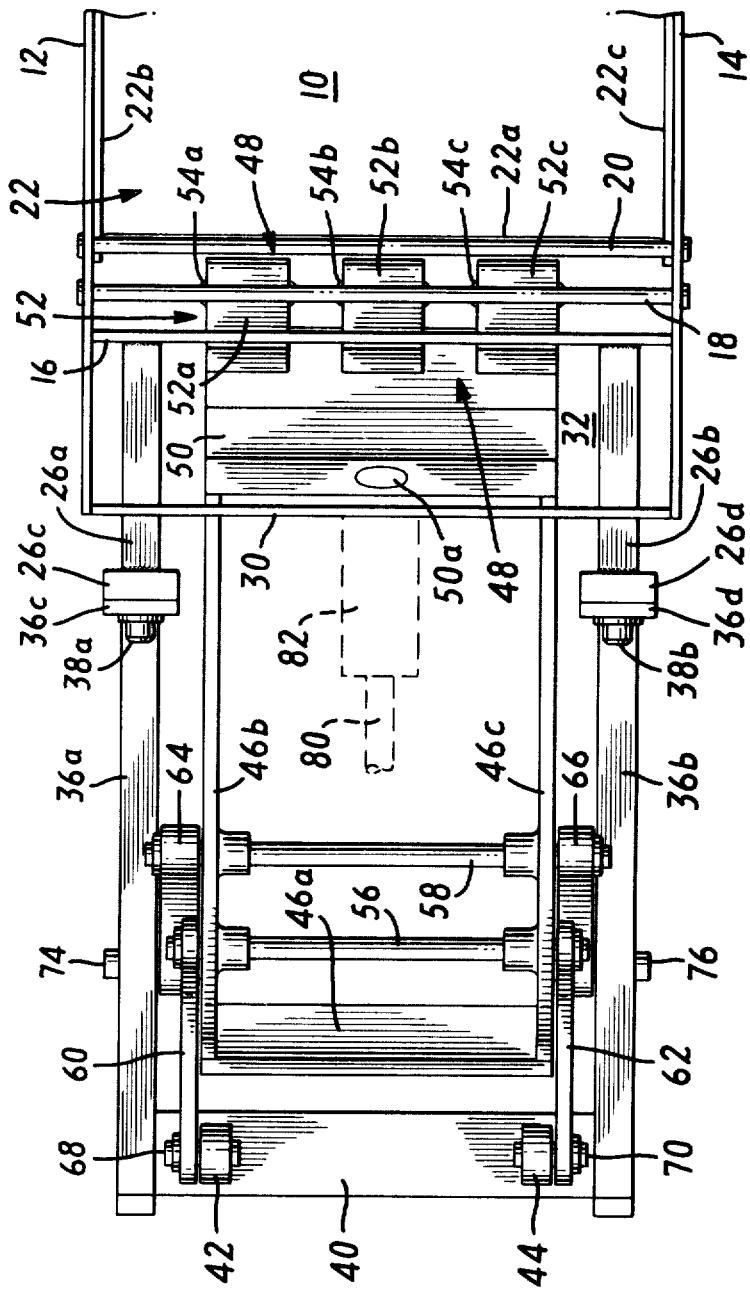
FIG. 4 is a plan view of the pattern retrieval apparatus in its FIG. 2 state with the article stack removed for clarity.

Referring jointly to FIGS. 1 and 4, article storage compartment 10 is bounded by sidewalls 12 and 14 and front wall 16 having access opening 16a. Sidewalls 12 and 14 support opposite ends of retaining rods 18 and 20, lower rod 20 being situated inwardly of upper rod 18 and slightly above inclined article shelf 22. Shelf 22 includes a base 22a and sidewalls 22b and 22c. Patterns 24, meaning envelopes containing patterns, are supported on base 22a and are spring-biased to place lead article L in engagement with rods 18 and 20 by biasing means (not shown) well known in the art. The patterns are stacked successively along stacking axis S, extending centrally through lead article L, such axis being useful as a reference in delineating the subject invention. Compartment front wall 16 supports horizontally projecting arms 26a and 26b, each having a coupling 28a and 28b forwardly of upright 30.

Upright 30 and wall 16 define therebetween a chute 32 comprising a vertical drop for patterns. While not shown, such chute may terminate in any suitable conveyor apparatus for centrally collecting patterns issuing from the chute.

Pattern retriever mechanism 34 includes sideward arms 36a and 36b, each having a coupling 36c and 36d joined to couplings 26c and 26d as by bolts 38a and 38b for removably securing the retriever mechanism to the compartment structure. As will be appreciated, such arrangement facilitates ready removal of the retriever mechanism for servicing or replacement. Retriever mechanism arms 36a and 36b are secured to one another through crossbar 40 which includes bearing supports 42 and 44.

A suction head frame includes crossbar 46a joined to opposed side struts 46b and 46c, which are supportingly connected to suction head 48 and manifold 50. Suction head 48 includes a rigid deflector element 52 having spaced posts 52a–c and upper and lower banks of suction cups 54a–f. A negatively pressurized air hose (not shown) is connected to fitting 50a of manifold 50 for selectively creating suction pressure in cups 54a–f. First and second shafts 56 and 58 extend through and beyond struts 46b and 46c. Opposed ends of shaft 56 rotatably support first ends of links 60 and 62 and opposed ends of shaft 58 rotatably support first ends of links 64 and 66. The other ends of links 60 and 62 are rotatably supported by pins 68 and 70 seated respectively in bearing supports 42 and 44. The remaining ends of links 64 and 66 are rotatably supported by pins 74 and 76 seated respectively in arms 36a and 36b. As will be appreciated, the illustrated retriever mechanism 34 includes a four-bar linkage serving as a drive adapted to impart prescribed composite vertical and horizontal motion to suction head 48.

In operation of the apparatus of FIGS. 1–4, the retriever mechanism may receive suitable input to control leg 78 through link 80, both shown in broken lines in FIG. 1. Link 80 may be displaced rightwardly and downwardly from its illustrated position by such as a pneumatic cylinder 82 illustrated in broken lines in FIG. 4.

Figure 2:
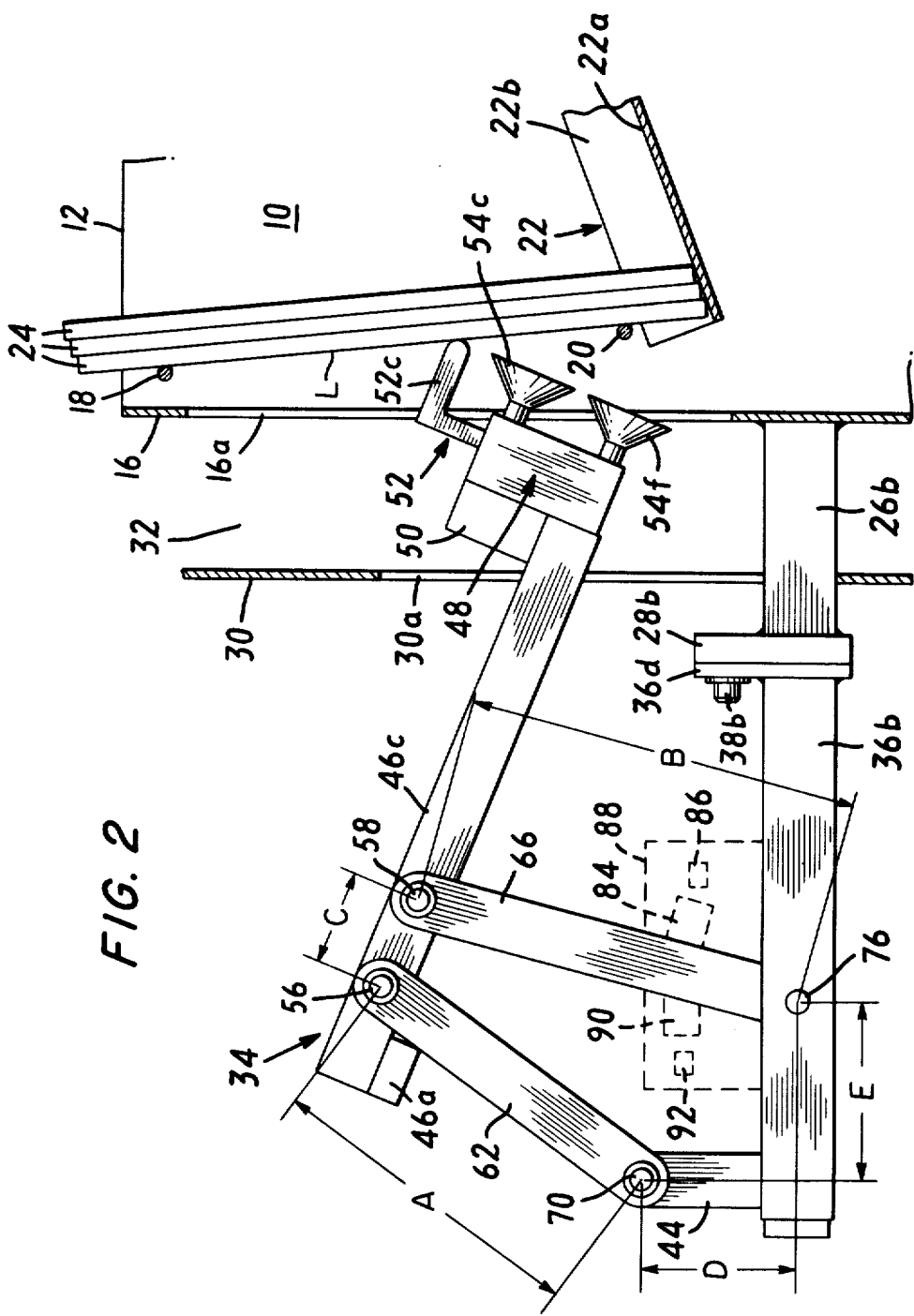
Figure 3:
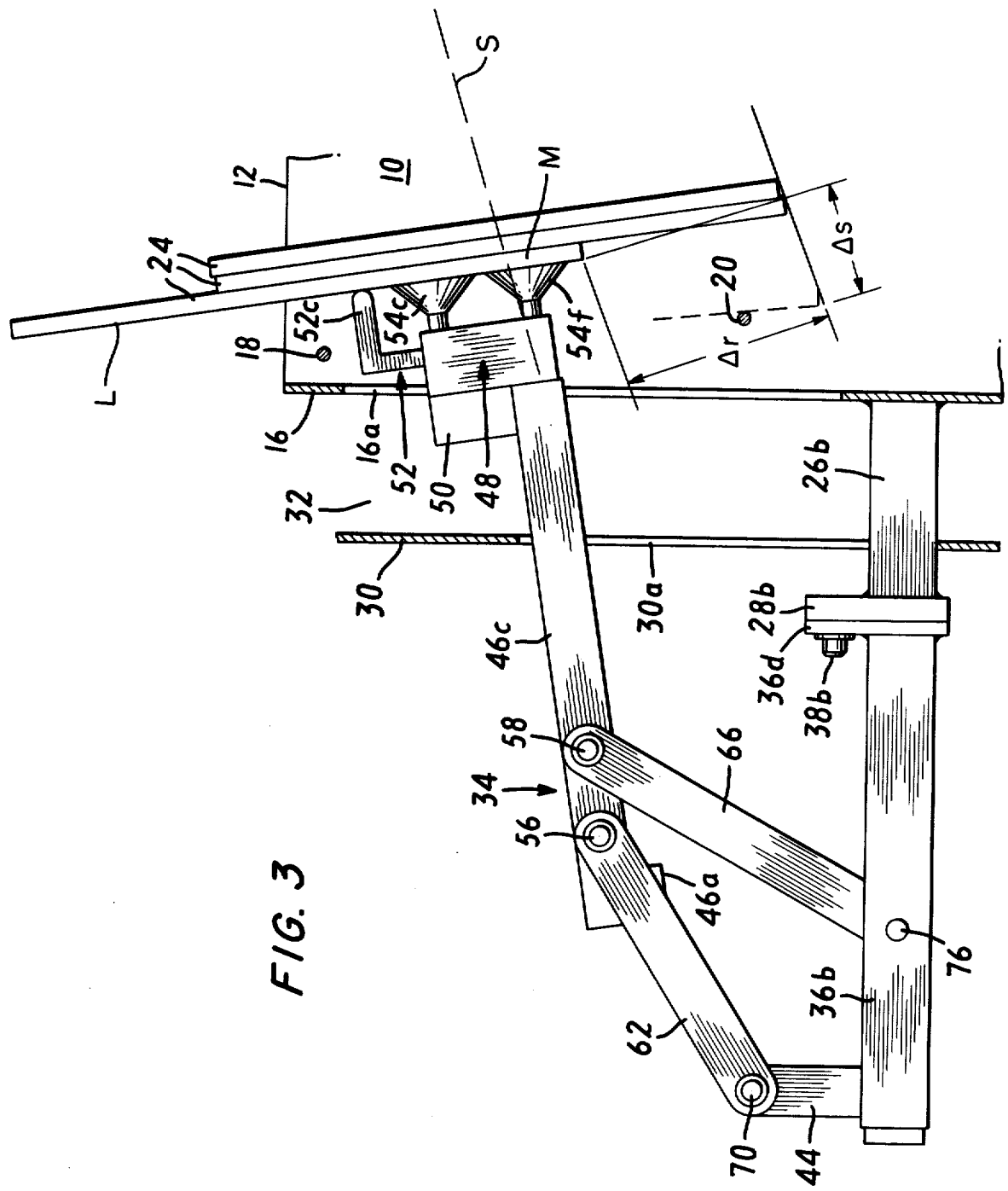

The retriever mechanism is illustrated in FIG. 1 in its retracted or rest position. On input thereto, the mechanism displaces suction head 48 as illustrated in FIGS. 2 and 3, in a path having vertical and horizontal movement components throughout as dictated by the particular four-bar linkage dimensions selected. In FIG. 2, the suction head is disposed in position such that deflector 52 engages the lead article in the article stack. By appropriate selection of the material comprising the deflector, such engagement is frictional and the suction head is accordingly adapted for displacing the engaged lead article jointly therewith at a stage preceding suctional force therebetween. As a result, continued motion of the suction head from its FIG. 2 position eventuates in displacement of the lead article in its entirety transversely of stacking axis S, as shown in FIG. 3 and, concomitantly, displacement of the lead article and the remainder of the stack inwardly along axis S. In the FIG. 3 showing, it will be noted that marginal portion M of the lead pattern has been displaced a distance $\Delta S$ along the stacking axis and amount $\Delta r$ in a direction transverse to the stacking axis.

Referring again to FIG. 2, link 66 includes on its interior side a lug 84 supported in position to operate switch 86 of pneumatic switch assembly 88 thereby applying suction pressure to head 48. As indicated by the relative FIG. 2 spacings of lug 84 and switch 86, switch 86 is operated upon movement of link 66 somewhat further clockwise of its FIG. 2 disposition whereby suctional pressure is applied to head 48 prior to engagement of the lead article and the suction cups. Thus, suction force is operative to continue the initial frictional force transverse displacement of the lead article by deflector 52 to dispose the lead article in its FIG. 3 position.

At this juncture, the lead article may be displaced outwardly of the stack without any portion thereof encountering resistance from lower retaining rod 20. As will be appreciated, such outward displacement of the lead article may be accommodated along any of a multiplicity of paths without encountering rod 20. In the embodiment of FIGS. 1–4, rightward and leftward strokes of the driving mechanism impart identical motion to the suction head and, accordingly, the withdrawal path is identical to the insertion path.

In its leftward stroke from its FIG. 3 position, the suction head displaces the engaged portion of the lead article outwardly of the stack and, on further displacement of such withdrawn portion of the lead article, withdraws the opposite marginal portion sequentially from the stack. In the FIG. 1–4 embodiment, it will be appreciated that such opposite marginal portion of the lead article is withdrawn in sliding relation to upper rod 18 and the article is subjected to nominal deflection. With central aperture 30a of upright 30 being of lesser area than the frontal area of the lead article, the lead article is stripped from the suction head as the lead article engages the upright and drops into chute 32.

In the leftward stroke of the retriever mechanism, lug 90 (FIG. 2) of link 66 operates switch 92 of assembly 88 at which time the application of suction pressure to head 48 is discontinued. This event occurs when link 66 is somewhat further counterclockwise of its FIG. 2 disposition with the lead article withdrawn from the stack.

In use of the specific four-bar linkage shown in the drawings, the lead article is displaced both transversely of and along stacking axis S, such displacement being accomplished by applying force to the lead article having simultaneous force components directed both parallel and transverse to the stacking axis. Evidently, such desired displacement of the lead article may be effected by different mechanisms applying such force components thereto in time-spaced relation, i.e., displacement of the lead article exclusively axially along the stacking axis followed by exclusive transverse displacement thereof.

Figure 5A:
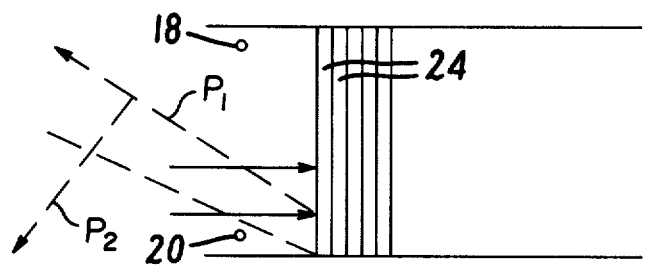
FIGS. 5(a)-(d) are schematic illustrations descriptive of other suction head movements contemplated in the invention.
Figure 5B:
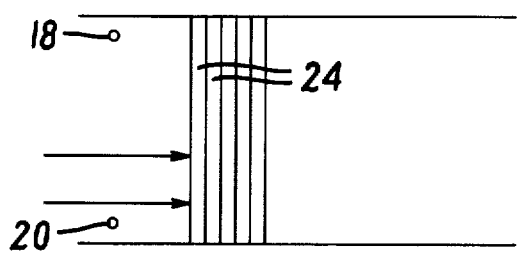
Figure 5C:
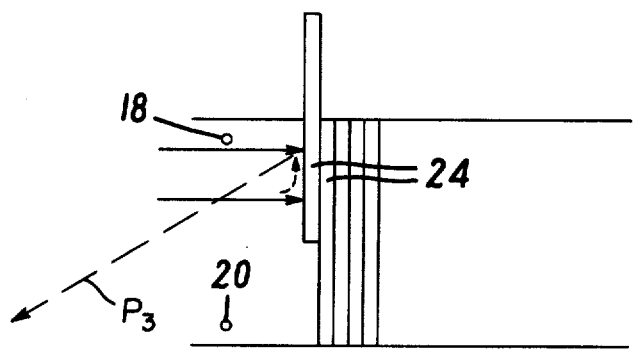
Figure 5D:
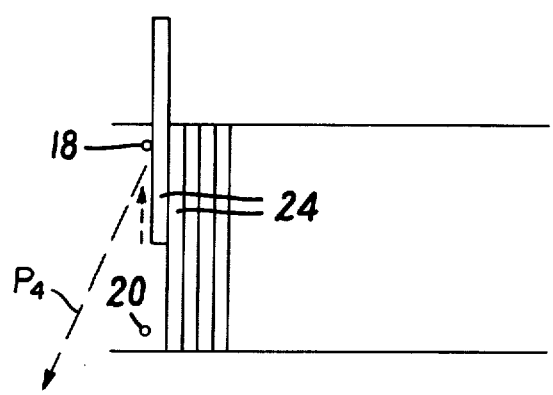

In a further variation, shown schematically in FIG. 5(a), the lead article is displaced exclusively axially along the stacking axis. Withdrawal of the suction head could then proceed along such as paths $P_1$-$P_2$ without lead article restraint by rod 20. In FIG. 5(b), the lead article is displaced as in FIG. 5(a) but to a lesser axial extent. From such position, the article is displaced jointly axially and transversely, as shown in FIG. 5(c), with transverse displacement predominant. Withdrawal of the suction head may then proceed along path $P_3$. In FIG. 5(d), the lead article is displaced exclusively transversely of the stacking axis and may then be withdrawn along path $P_4$.

In FIG. 2, reference letter A denotes distance along link 62 between the centers of pin 70 and shaft 56, B denotes distance along link 66 between the centers of pin 76 and shaft 58, C denotes distance along strut 46c between the centers of shafts 56 and 58, D denotes vertical distance between the centers of pins 70 and 76 and E denotes horizontal distance therebetween. In absolute values and with C equal to unity, the heretofore specifically discussed suction head motion may be attained with A equal to 3.04, B equal to 3.70, D equal to 1.50 and E equal to 1.70.

Turning now to the particularly preferred embodiment, shown in FIGS. 6-11, primed reference numerals identify mechanism elements having counterparts in the embodiment of FIGS. 1-4. Modifications introduced in the embodiment of FIGS. 6-11 include the supporting of suction head 48' for pivotal movement, the provision of draw-bar 94 for imparting selective rotation to head 48', the use of a single suction cup 54', varied forms of upper and lower restraint elements 18' and 20' and the addition of separator arm assembly 96. Optional frictional engagement of patterns, as by deflector elements, in the embodiment of FIGS. 1-4, is also omitted.

Figure 6:
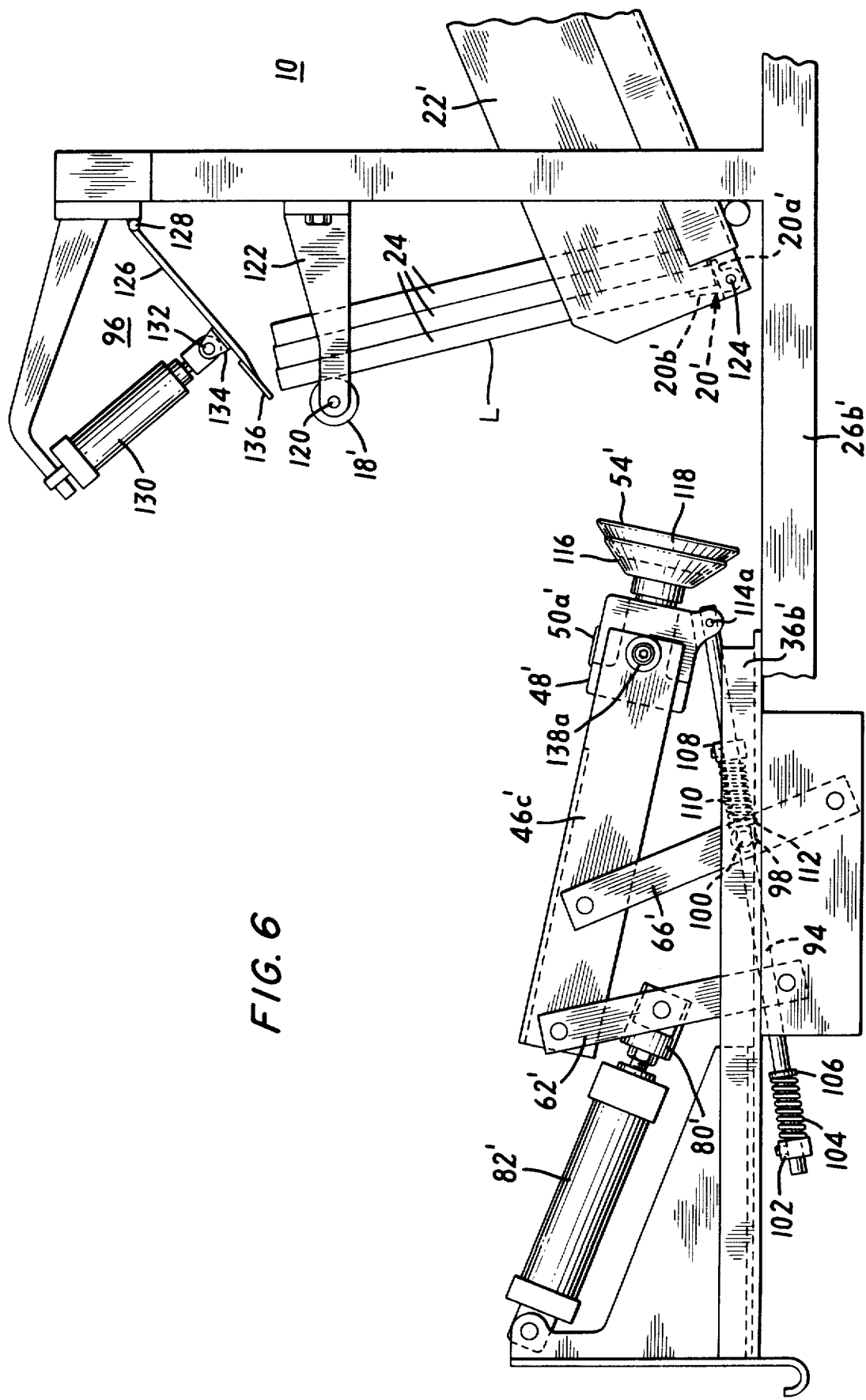
FIGS. 6–10 are frontal views of a further embodiment of pattern retrieval apparatus of the invention in respective successive movements thereof toward and engaging an article stack.
Figure 11:
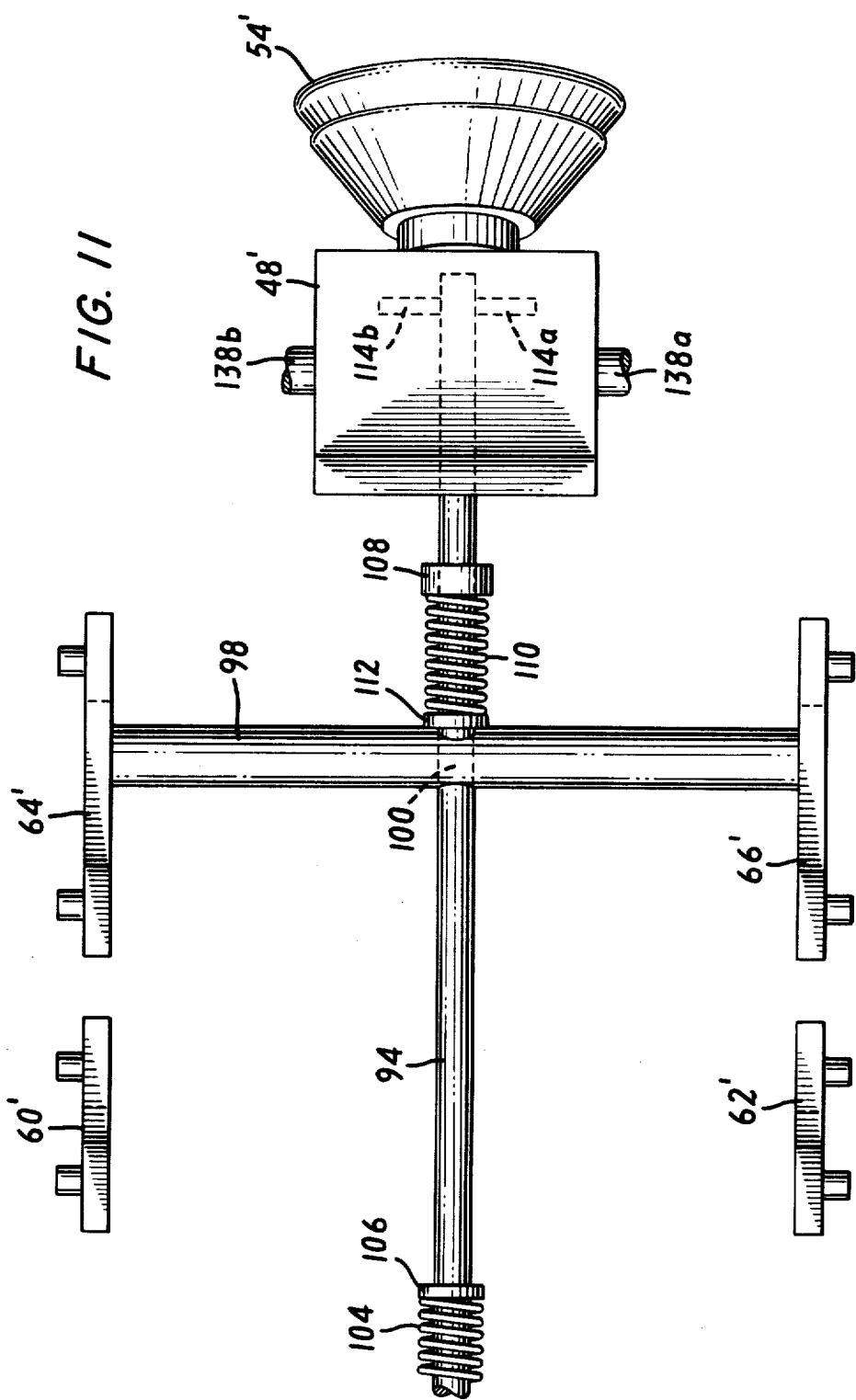
FIG. 11 is a plan view of the pattern retrieval apparatus of FIGS. 6–10 in its FIG. 6 state with various members removed for clarity.

Referring to FIGS. 6 and 11, links 64' and 66' support a transverse guide 98 having a central opening 100 therethrough facilitating free passage of draw-bar 94. Adjacent its leftward end, draw-bar 94 includes a collar 102 rightwardly of which is a spring 104 secured in position by stop ring 106. At a position intermediate its opposite ends, draw-bar 94 has a further collar 108 secured thereto leftwardly of which is disposed spring 110 and stop ring 112. At its end proximate collar 108, draw-bar 96 includes pins 114a and 114b pivotally engaging suction head 48'. Suction cup 54' includes a metallic base 116 sealably supporting a flexible cup 118 having a central opening through which suction pressure may be applied to articles to be retrieved.

Upper restraining element 18' is in the form of a roller supported for rotation on pin 120 of bracket 122. Lower restraining element 20' is rotatably supported on pin 124 and includes a portion 20a' disposed beneath stacked articles and an upstanding portion 20b'. As will be seen, element 20' rotates counterclockwise when an article bin is empty, thereby providing indication by portion 20b' of this condition.

Separator arm assembly 96 includes a flap 126 rotatable about pin 128 to be positioned as directed by pneumatic cylinder 130, the piston extension of which includes a pin 132 pivotally secured to flange 134 attached to flap 126. At its free end flap 126 has removably secured thereto fingers 136, the function of which is discussed below.

Figure 7:
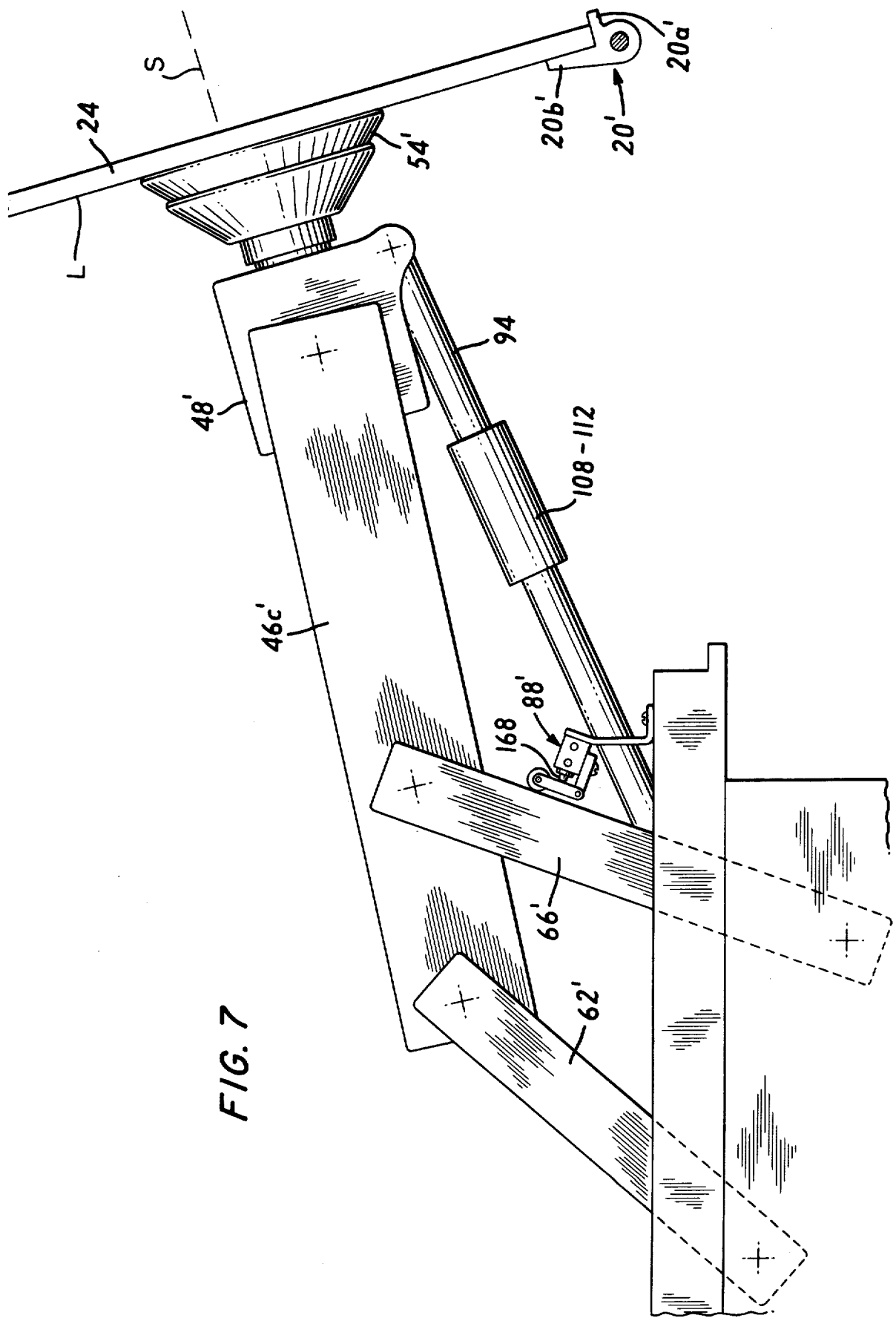
Figure 8:
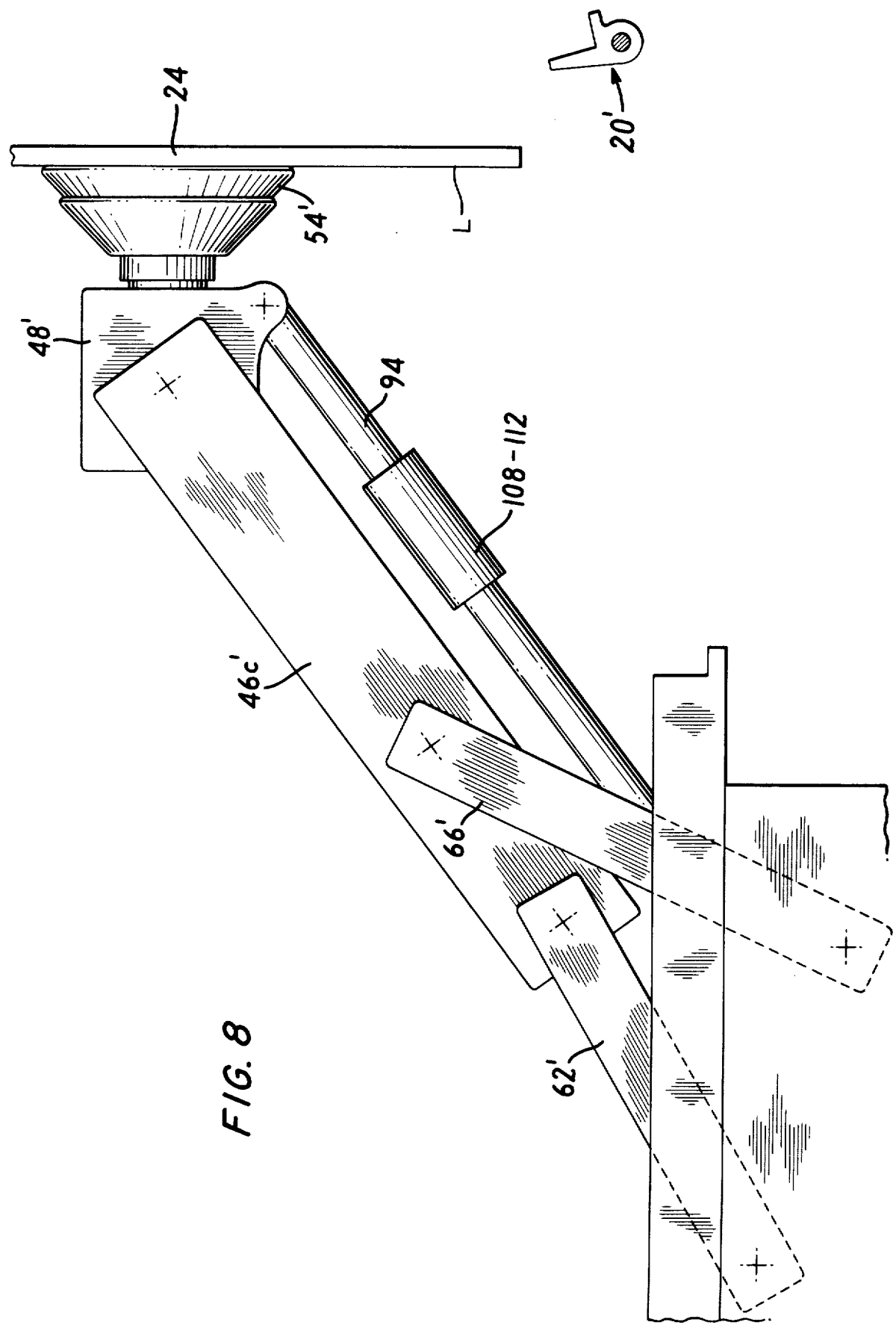
Figure 9:
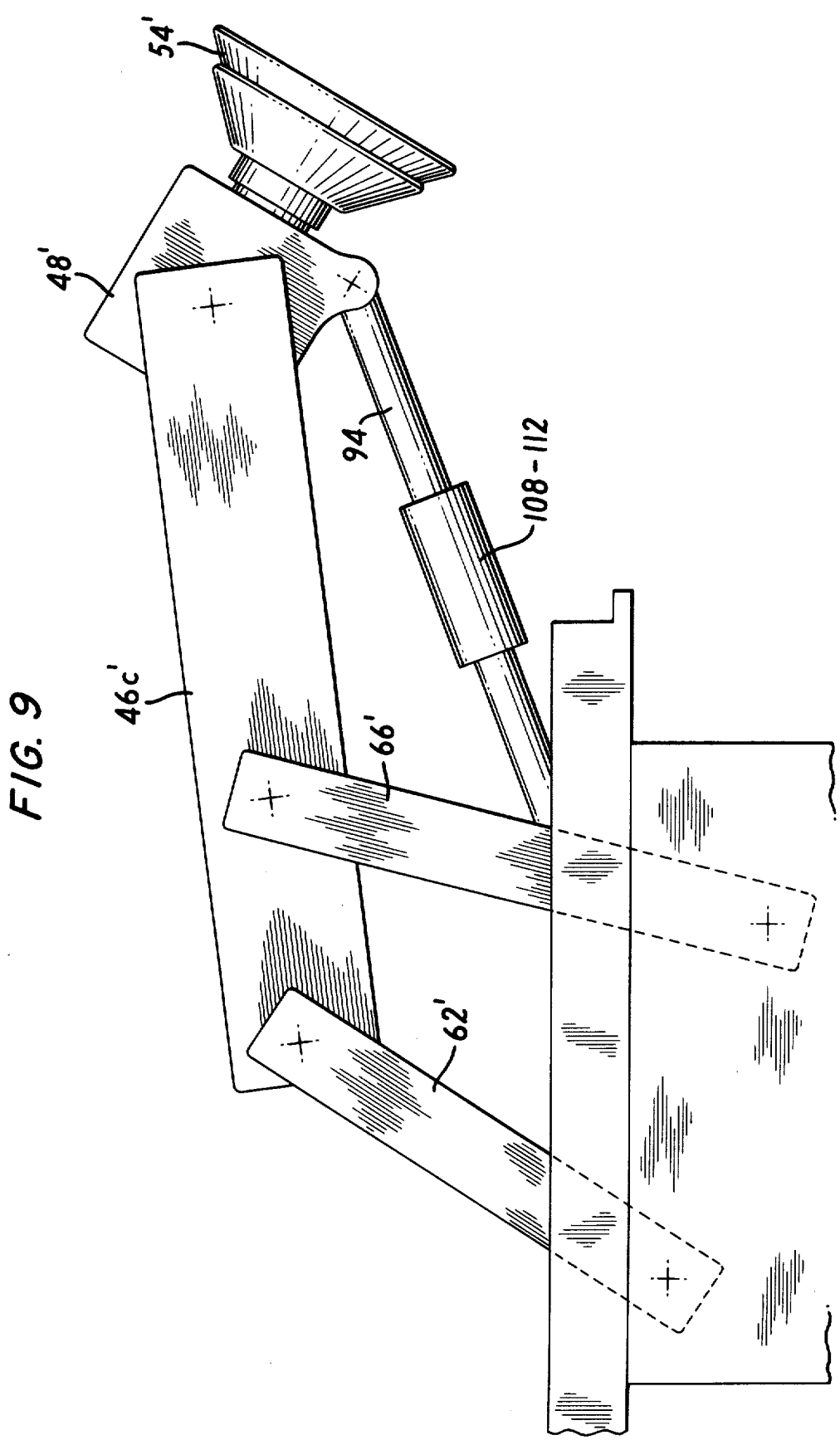
Figure 10:
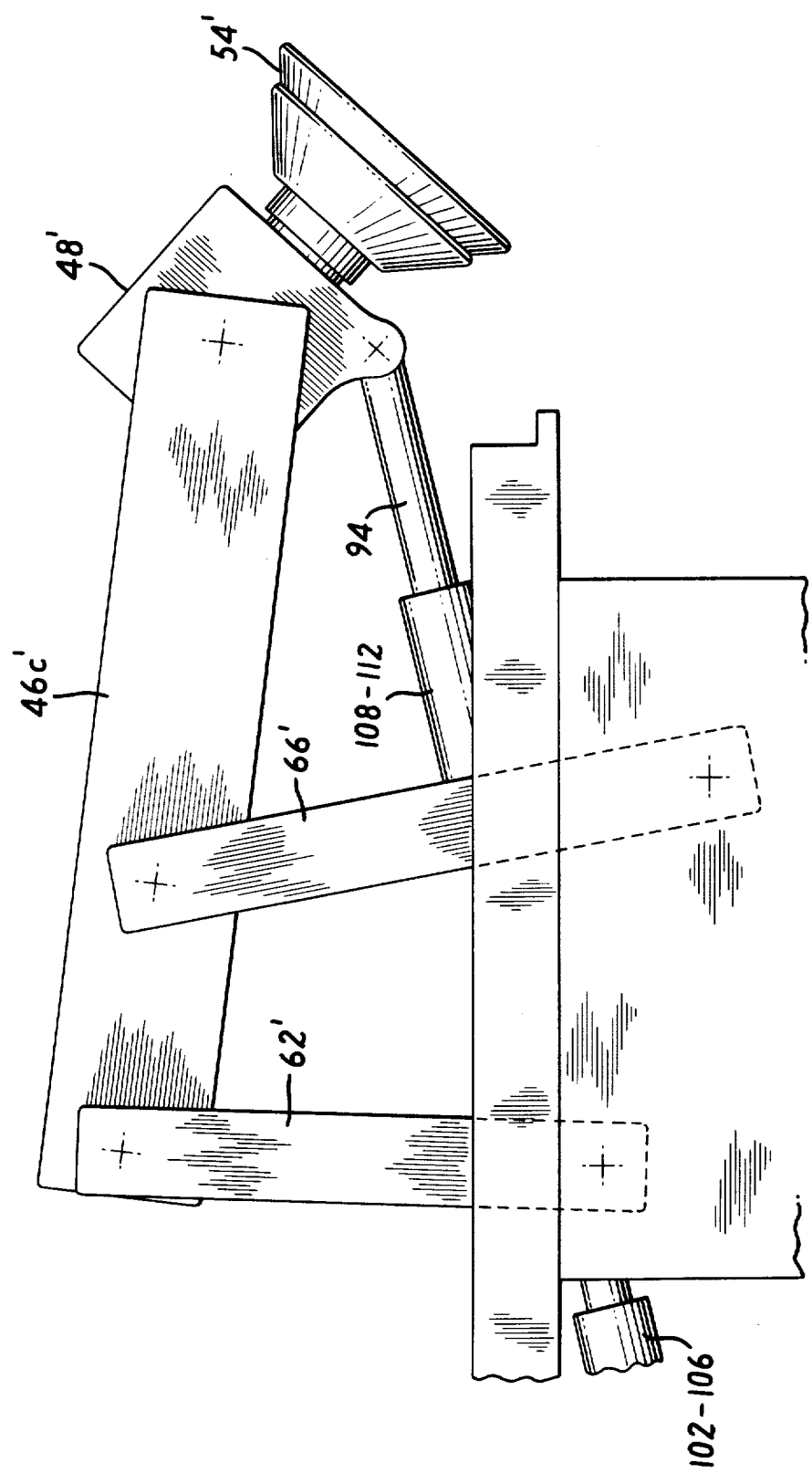

Based on the inertia of suction head 48' and by selection of suitable friction as between respective bearing surfaces of pins 138a and 138b and their counterpart bearing surfaces (side strut 46c for pin 138a), the suction head retains any assumed orientation unless disturbed by force applied thereto by draw-bar 94. As head 48' advances rightwardly from its FIG. 6 position (home or rest state), draw-bar 94 passes freely through opening 100 of guide 98 until spring 104 bottoms against guide 98. In the course of this advance, as shown in FIG. 7, head 48' is in like orientation relative to side strut 46c as in FIG. 6, engages lead article L and then displaces the same inwardly along stacking axis S and upwardly transversely thereof, being in suction pressure engagement therewith by operation of control equipment discussed below. Upon the bottoming of spring 104 against guide 98, head 48' assumes different orientation, i.e., being rotated clockwise and, as the head commences return (leftward) movement, the lead article lower marginal portion thereby readily clears lower restraint 20' (FIG. 8) and exits the article stack with the upper marginal portion of the lead article moving outwardly under roller element 18'.

In its return movement, head 48' maintains its newly-assumed orientation (FIGS. 9 and 10) until spring 110 bottoms against guide 98 whereupon (FIG. 6) the head reassumes its rest state orientation, readied for the next cycle of operation.

In operation of the embodiment of FIGS. 6-11, the mechanism thereof other than head 48' undergoes like orientation in advancing and returning strokes. As discussed, however, head 48' experiences asymmetric disposition in contrast to its fixed disposition in the FIGS. 1-4 embodiment, and the variation in mechanism advancing and return strokes, as in FIGS. 5(a)-5(d).

Change in orientation of the suction head may evidently be provided in the embodiment of FIGS. 6-11 by measures other than resilient units supported in longitudinally spaced relation on an elongate draw-bar for rotating the head in respective opposite senses. Where the specific draw-bar arrangement is employed, the dispositions of the resilient units (springs 104 and 110) may be suitably adjusted by the provision of collars which are releasably secured to the draw-bar, as in FIG. 6.

Where particularly reliable picking accuracy is required, the invention contemplates introduction of the abovementioned separator arm assembly 96. By control equipment discussed below in connection with FIG. 12, air cylinder 130 is operated to displace flap 126 in the course of operation of the apparatus whereby spring fingers 136, comprising flexible metal strips, are placed in engagement with the article, immediately inwardly of the lead article to assure that, irrespective of the character of the stacked articles, solely the lead article is displaced transversely of the stacking axis. Following this participation in the retrieval cycle, cylinder 130 retracts flap 126 such that the remaining articles in the stack may assume the stack configuration shown in FIG. 6, i.e., with the lead article thereof frontally engaging roller element 18' and lower restraining element 20'.

Figure 12:
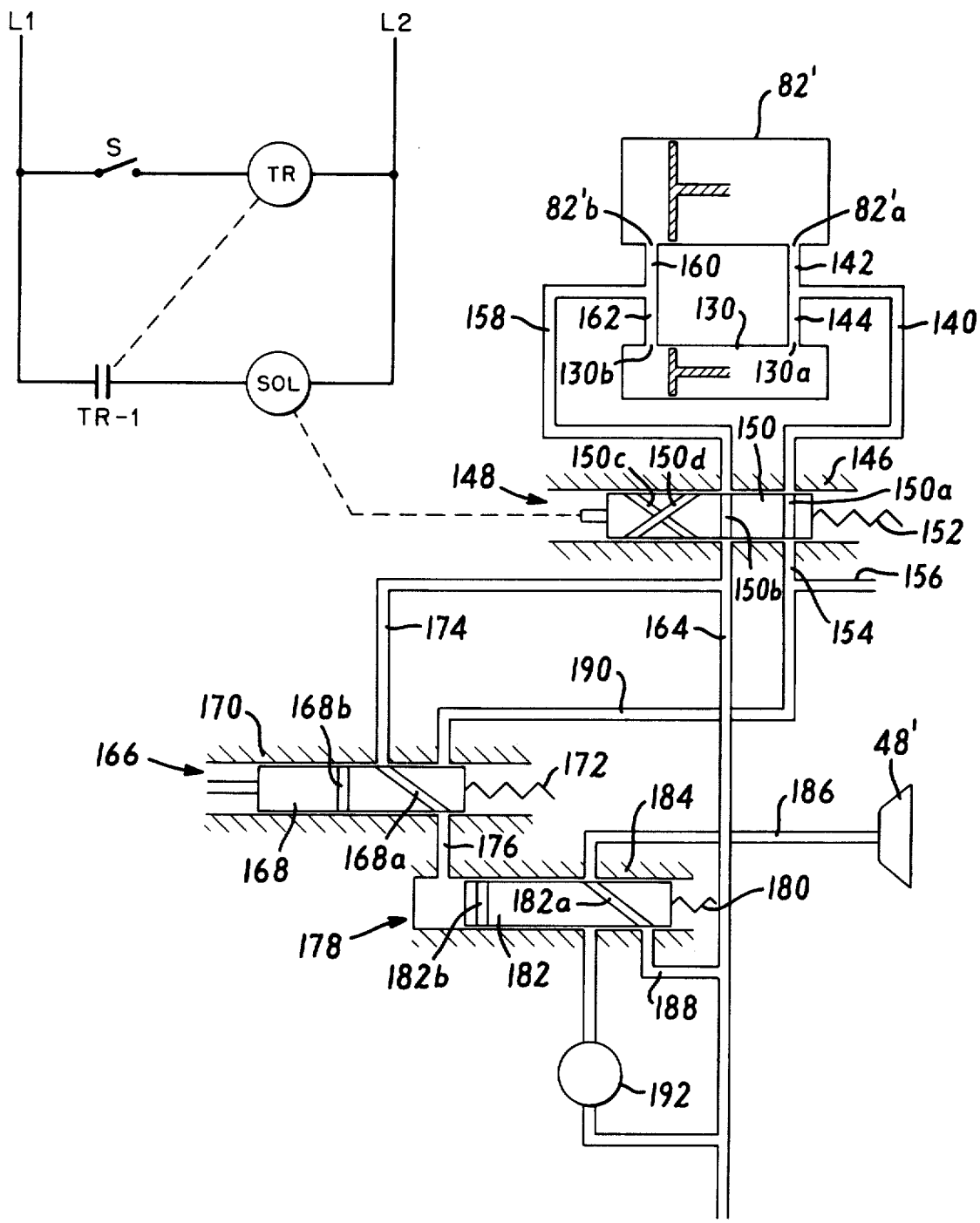
FIG. 12 is a schematic diagram of a control system usable in conjunction with the embodiment of FIGS. 6–11.

Turning now to FIG. 12, the control equipment therein serves to operate air cylinder 82' whereby inward and return strokes are accomplished, to selectively apply suction pressure to suction cup 54' and to effect the foregoing operation of air cylinder 130 in controlling the positioning of flap 126.

In FIG. 12, cylinders 82' (stroke) and 130 (separator) are shown in their rest positions, their pistons being urged against stops (not shown) by pressurized air applied through ports 82'a and 130a from conduits 140, 142, and 144. Conduit 140 extends through housing 146 of directional valve 148. With spool 150 of valve 148 biased into its illustrated position by spring 152, spool passage 150a registers with conduits 140 and 154. Conduit 156, connected to conduit 154, is supplied with positively pressurized air, e.g., at sixty psi, from a source (not shown). Ports 82'b and 130b of cylinders 82' and 130 are connected through conduits 158, 160 and 162 and spool passage 150b to exhaust conduit 164.

Electrical lines L1 and L2, e.g., suitably fused power mains, have first and second branch circuits connected thereacross, respectively, switch S in series with time delay relay TR and contacts TR-1 of relay TR and solenoid SOL. As indicated, solenoid SOL positions spool 150 of directional valve 148.

Upon closure of switch S, which may be done by a computer or hard-wired control or manually, relay TR is energized, closing contacts TR-1 and in turn energizing solenoid SOL. Spool 150 is driven rightwardly such that spool criss-cross passage 150c registers with conduits 154 and 158 and spool criss-cross passage 150d registers with conduits 140 and 164. Pressurized air accordingly now flows from conduit 156 through conduit 154, spool passage 150c and conduit 158 into the leftward ends of cylinders 82' and 130 whereupon their pistons advance rightwardly. Return flow is through conduits 140, 142 and 144 and spool passage 150d to conduit 164. As relay TR times out, contacts TR-1 are opened and spool 150 is returned to its FIG. 12 position by spring 152, whereupon the pistons of cylinders 82' and 130 advance leftwardly.

Switch assembly 88' (FIG. 7) includes pilot valve 166 of FIG. 12. Spool 168 of valve 166 is displaceable in valve housing 170 by engagement with link 66' (FIG. 7) and is otherwise biased into its FIG. 12 position by spring 172. In such rest position, cross-cross spool passage 168a is in registry with conduits 174 and 176 whereby the leftward end of vacuum valve 178 is connected to return conduit 164 and hence is not positively pressurized. Spring 180 accordingly biases spool 182 in housing 184 to the position shown therefor in FIG. 12. Criss-cross spool passage 182a connects conduit 186 of suction head 48' through conduit 188 to return conduit 164.

When link 66' displaces pilot valve spool 168 to a position wherein its passage 168b is in registry with conduits 176 and 190, pressurized air from conduit 156 issues through the pilot valve into the leftward end of vacuum valve 178 and spool 182 is driven rightwardly such that spool passage 182b registers with conduits 186 and 190. At this juncture, vacuum pump 192 applies suction pressure to head 48'. As link 66' recedes from engagement with spool 168, the spool is returned to its FIG. 12 state, discontinuing delivery of suction pressure to head 48'.

Various changes and modifications may evidently be introduced in the foregoing particularly disclosed methods and apparatus without departing from the invention. Thus, the foregoing preferred embodiments and practices are intended in an illustrative and not in a limiting sense. The true spirit and scope of the invention is set forth in the following claims.

What is claimed is:

1. In an article storage and retrieval system having storage means supporting generally flat articles successively axially along a stacking axis and first and second retaining elements engaging the lead article in such article stack at respective first and second marginal portions thereof, apparatus for removing said lead article from said stack comprising:
  a. head means including first means for suctionally engaging said lead article and second means supported in spaced relation to said first means for frictionally engaging said lead article;
  b. drive means for moving said head means to place said first means into said engaging relation with said lead article prior to placing said second means in engagement with said lead article and for displacing said head means to dispose said lead article in such flat configuration with said first marginal portion thereof spaced from said first retaining element and for then moving said head means outwardly with respect to said storage means along a path maintaining said lead article spaced from said first retaining element.

2. In an article storage and retrieval system having storage means supporting generally flat articles successively axially along a stacking axis and first and second retaining elements engaging the lead article in such article stack at respective first and second marginal portions thereof, apparatus for removing said lead article from said stack comprising:
  a. rotationally supported head means for suctionally engaging said lead article and displacing said lead article jointly therewith upon such engaging relation therebetween; and
  b. drive means for moving said head means into said engaging relation with said lead article and for then displacing said head means to dispose said lead article in such flat configuration with said first marginal portion thereof spaced from said first retaining element and for then moving said head means outwardly with respect to said storage means along a path maintaining said lead article spaced from said first retaining element, said drive means including means for imparting selective rotation to said head means, such rotation imparting means comprising a guide and an elongate member movable through said guide, said elongate member supporting first and second longitudinally displaced resilient means separately engageable with said guide for imparting respectively opposite sense rotation to said head means.

3. A method for removing the lead article from a plurality of generally flat articles by use of a suction head comprising the steps of:
  a. stacking said articles successively axially inwardly along a stacking axis and retaining said articles in such stack by imposing axial restraint upon first and second marginal portions of said lead article disposed transversely of said stacking axis;

b. preselecting a path for withdrawal from said stack of said lead article wherein said first portion thereof is free of such axial restraint;

c. disposing said head in suctional engagement with said lead article and displacing said lead article inwardly along said stacking axis to free said first portion thereof from said axial restraint and dispose said first portion in such preselected path; and d. moving said head outwardly of said stack in such suctional engagement with said lead article in manner maintaining said lead article in said preselected path.

4. An article storage and retrieval system comprising:

a. storage means for containing generally flat articles successively axially inwardly along a stacking axis, said storage means including
 1. first and second retaining elements engaging the lead article in such article stack at respective first and second marginal portions thereof and
 2. means supporting such article stack for movement inwardly along said stacking axis;

b. head means for suctionally engaging said lead article and displacing said lead article jointly therewith upon such engaging relation therebetween; and c. drive means for moving said head means
 1. into such engagement with said lead article, then
 2. axially inwardly with respect to said stacking axis in measure sufficient to dispose said lead article first marginal portion in spaced relation to said first retaining element; and then
 3. axially outwardly with respect to said stacking axis in manner maintaining said lead article first marginal portion spaced from said first retaining element.

5. The invention claimed in claim 4 wherein said means for applying suction to said lead article includes suction cup members and first switch means operable to conduct suction pressure to said cup members, said drive means operating said first switch means.

6. The invention claimed in claim 5 wherein said means for applying suction to said lead article further includes second switch means operable to discontinue such conducting of suction pressure to said suction cup members, said drive means further operating said second switch means.

7. The system claimed in claim 4 wherein said drive means further drives said head means transversely of said stacking axis in such axially inward movement of said drive means with respect to said stacking axis.

8. The system claimed in claim 4 wherein said drive means further rotates said head means in such axially inward movement of said drive means with respect to said stacking axis.

9. The system claimed in claim 8 wherein said drive means includes resilient means for imparting preselected rotation to said head means in such axially inward movement of said head means.

* * * * *